(12) United States Patent
Hatcher (10) Patent No.: US 11,051,589 B2
(45) Date of Patent: Jul. 6, 2021

(54) CAM BUCKLE

(71) Applicant: Winston Products LLC, Cleveland, OH (US)

(72) Inventor: Troy Hatcher, Bay Village, OH (US)

(73) Assignee: WINSTON PRODUCTS LLC, Cleveland, OH (US)

(*) Notice: Subject to any disclaimer, the term of this patent is extended or adjusted under 35 U.S.C. 154(b) by 30 days.

(21) Appl. No.: 16/527,605

(22) Filed: Jul. 31, 2019

(65) Prior Publication Data

US 2020/0060389 A1 Feb. 27, 2020

Related U.S. Application Data

(60) Provisional application No. 62/722,579, filed on Aug. 24, 2018.

(51) Int. Cl.
*A44B 11/14* (2006.01)
*A44B 11/04* (2006.01)
*A44B 11/16* (2006.01)

(52) U.S. Cl.
CPC .............. *A44B 11/14* (2013.01); *A44B 11/04* (2013.01); *A44B 11/16* (2013.01)

(58) Field of Classification Search
CPC ......... A44B 11/14; A44B 11/16; A44B 11/12; B60P 7/0838; Y10T 24/4016; Y10T 24/4072
See application file for complete search history.

(56) References Cited

U.S. PATENT DOCUMENTS

| | | | | |
|---|---|---|---|---|
| 2,998,626 A * | 9/1961 | Prete, Jr. | ................ | A44B 11/14 24/170 |
| 3,177,545 A * | 4/1965 | Svensson | ................ | A44B 11/14 24/170 |
| 3,253,309 A * | 5/1966 | Baresch | ................ | B65D 63/16 24/170 |
| 3,413,691 A * | 12/1968 | Elsner | ................ | A44B 11/14 24/170 |
| 3,678,542 A * | 7/1972 | Prete, Jr. | ................ | B60P 7/0823 24/191 |
| 4,881,303 A * | 11/1989 | Martini | ................ | A44B 11/14 24/170 |
| 5,291,638 A * | 3/1994 | Huang | ................ | A44B 11/14 24/170 |
| 5,920,963 A * | 7/1999 | Chou | ................ | F16G 11/106 24/170 |
| 6,158,092 A * | 12/2000 | Huang | ................ | B60P 7/0838 24/68 CD |
| 2001/0039696 A1* | 11/2001 | Maciejczyk | ........... | A44B 11/14 24/170 |
| 2003/0041420 A1* | 3/2003 | Kosh | ................ | A44B 11/12 24/193 |
| 2010/0275420 A1* | 11/2010 | Huang | ................ | B60P 7/0838 24/68 CD |

* cited by examiner

*Primary Examiner* — Robert Sandy
*Assistant Examiner* — Rowland Do
(74) *Attorney, Agent, or Firm* — Tucker Ellis LLP (57) ABSTRACT

Provided is a cam buckle including a body having at least one slot, and a cam arm movably coupled to and pivotable relative to the body. The cam arm has teeth for engaging a webbing and at least one boss for engaging the at least one slot. The cam arm is biased in an unlocked position where the teeth are configured to engage the webbing, and the cam arm is movable to a locked position where the teeth are configured to be disengaged from the webbing and the at least one boss is held in the at least one slot.

19 Claims, 8 Drawing Sheets

CAM BUCKLE

RELATED APPLICATIONS

This application claims the benefit of U.S. Provisional Application No. 62/722,579 filed Aug. 24, 2018, which is hereby incorporated herein by reference.

FIELD OF INVENTION

The present invention relates generally to a cam buckle, and more particularly to a cam buckle locking mechanism.

BACKGROUND

A cam buckle can be used to secure a wide variety of objects to various support surfaces and/or to various other objects. A cam buckle has a movable cam and a webbing with at least one extendable end. In one example, the cam buckle can include two webbing assemblies, including one webbing assembly of a fixed, non-extendable length and another webbing assembly that is extendable to make the cam buckle adjustable to a wide variety of lengths. The distal ends of both webbing assemblies can be attached to suitable anchor points on an object or surface. The cam can then be used to remove any slack in the webbing assemblies and hold the webbing assemblies in tension to ensure that the object to be secured is retained securely.

SUMMARY OF INVENTION

The present application provides is a cam buckle including a body having at least one slot, and a cam arm movably coupled to and pivotable relative to the body. The cam arm has teeth for engaging a webbing and at least one boss for engaging the at least one slot. The cam arm is biased in an unlocked position where the teeth are configured to engage the webbing, and the cam arm is movable to a locked position where the teeth are configured to be disengaged from the webbing and the at least one boss is held in the at least one slot.

According to an aspect, a cam buckle is provided that includes a body having at least one slot, and a cam arm movably coupled to and pivotable relative to the body, the cam arm having teeth for engaging a webbing and at least one boss for engaging the at least one slot, wherein the cam arm is biased in an unlocked position where the teeth are configured to engage the webbing, and the cam arm is movable to a locked position where the teeth are configured to be disengaged from the webbing and the at least one boss is held in the at least one slot.

According to another aspect, a cam buckle is provided that includes a body having first and second opposed slots, a cam arm movable relative to the body from an unlocked position to a locked position and pivotable relative to the body about a pivot axis, the cam arm having teeth for engaging a webbing in the unlocked position, first and second bosses configured to engage the first and second opposed slots respectively in the locked position, and a passage extending therethrough, a deflectable member biasing the cam arm in the unlocked position, and a hinge pin disposed in the passage and coupled to the body.

According to yet another aspect, a cam buckle is provided that includes a body having first and second plates laterally spaced from one another, and a cam arm disposed between the first and second plates and movable and pivotable relative to the first and second plates between an unlocked position and a locked position, the cam arm having teeth for engaging a webbing in the unlocked position, wherein the cam arm is biased in the unlocked position where the teeth are configured to engage the webbing, and the cam arm is movable to the locked position where the teeth are configured to be disengaged from the webbing and the cam arm is locked relative to the body.

According to still another aspect, a cam buckle is provided that includes a body having first and second plates laterally spaced from one another, the first plate including a first slot and the second plate including a second slot, a cam arm disposed between the first and second plates and movable and pivotable relative to the first and second plates between an unlocked position and a locked position, the cam arm having teeth for engaging a webbing in the unlocked position, first and second bosses configured to engage the first and second slots respectively in the locked position, and a passage extending therethrough, and a hinge pin disposed in the passage and coupled to the first and second plates.

The foregoing and other features of the application are described below with reference to the drawings.

DETAILED DESCRIPTION

Turning initially to FIGS. 1-9, a cam buckle is shown generally at reference numeral 10. The cam buckle includes a body 12, a cam arm 14 pivotable relative to the body 12, a base 16 connected to the body 12, a deflectable member 18 biasing the cam arm 14 in an unlocked position, a webbing pin 20, and a hinge pin 22. The cam buckle 12 is shown in a first position, where the cam arm 14 is in the unlocked position and teeth 24 of the cam arm 14 are biased towards teeth 26 of the base 16 in a closed position to hold a first webbing 28 in tension.

Figure 10:
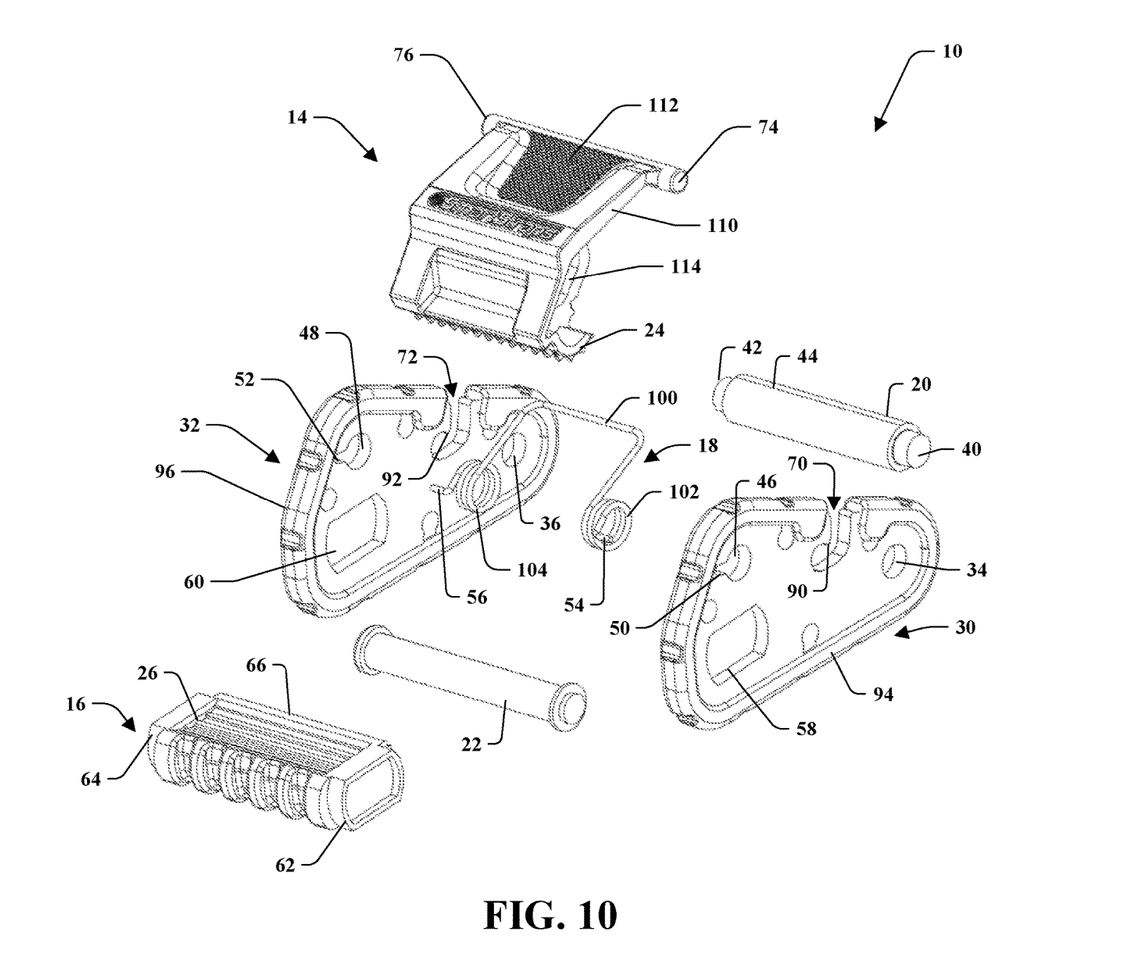
FIG. 10 is an exploded view of the cam buckle.

Referring additionally to FIG. 10, the body 12 includes first and second members or plates 30 and 32 coupled together by the base 16, the webbing pin 20, and/or the hinge pin 22, which can be attached to the body 12 in a suitable manner, such as by swaging. Although shown as including separate plates, it will be appreciated that the body 12 may be formed of a single piece or by separate plates coupled together, such as by welding or adhesive, by a coupling piece extending between the plates. Each of the first and second plates 30 and 32 includes a respective opening 34, 36 near a rear of the plates 30 and 32 that align with one another through which the webbing pin 20 extends to attach a second webbing 38 to the body 12. As shown, the webbing pin 20 includes a pair of projections 40 and 42 that are received in the openings 34 and 36 and which have a smaller diameter than a body 44 of the webbing pin 20 such that ends of the body 44 abut inner portions of the first and second plates 30 and 32.

Each of the first and second plates 30 and 32 additionally includes a respective opening 46, 48 near a front of the plates 30 and 32 that align with one another through which the hinge pin 22 extends to attach the cam arm 14 to the body 12. The openings 46 and 48 are substantially circular and each include a respective outwardly extending slot 50, 52 for receiving respective ends 54 and 56 of the deflectable member 18. Each of the first and second plates 30 and 32 further includes a respective opening 58 and 60 near the front of the plates 30 and 32 that align with one another through which the base 16 extends. As shown, the base 16 includes a pair of projections 62 and 64 that are received in the openings 58 and 60 and which have a width less than a width of a body 66 of the base 16 such that ends of the body 66 abut the inner portions of the first and second plates 30 and 32.

Figure 14:
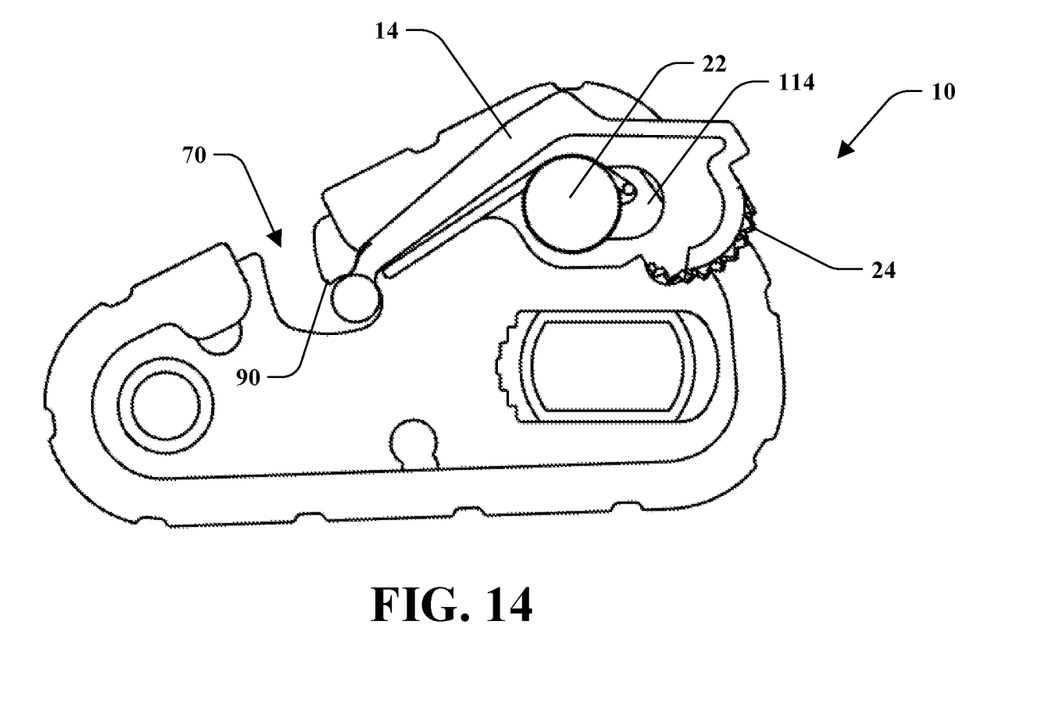
FIG. 14 is a cross-sectional view taken about line 14-14 in FIG. 13.

The first and second plates 30 and 32 each include a respective slot 70, 72 configured to receive a respective boss 74, 76 projecting from the cam arm 14 to lock the cam arm 14 in a locked position. The slots 70 and 72 each have a first portion 78, 80 extending downward from a top of each plate 30 and 32 and a second portion 82, 84 extending toward the openings 46, 48, 58, and 60 in the first and second plates 30 and 32. The second portion 82, 84 of the slots 70 and 72 each have an end 86, 88 with a geometry substantially matching a geometry of the bosses 74 and 76, as shown a circular geometry, for receiving the bosses 74 and 76 when the cam arm 14 is in the locked positions. The bosses 74 and 76 are disposed at upper portions of the ends 86 and 88 as shown in FIG. 14, and a gap is provided between the bottom of the bosses 74 and 76 and the lower portions of the ends 86 and 88. The bosses 74 and 76 are held in position by hooks 90 and 92 of the first and second plates 30 and 32 that extend downward into the second portion 82, 84. The hooks 90 and 92 serve as stops to prevent accidental disengagement of the bosses 74 and 76 from the second portions 78 and 80.

A bumper 94, 96 can surround edges of the first and second plates 30 and 32, such as a rubber or plastic bumper that may be attached in any suitable manner, such as by overmolding. The bumpers 94 and 96 prevent or reduce wear and damage to cargo and/or the vehicle caused by the cam buckle contacting the cargo/vehicle, such as due to vibration or movement during loading. The bumpers 94 and 96 also reduce or eliminate damage to the edges of the first and second plates 30 and 32. As shown, there is a break in the bumpers at the slots 70 and 72 such that the bumpers don't interfere with movement of the cam arm 14.

Turning now to the deflectable member 18 in detail, the deflectable member 18, which may be a spring, such as a modified torsion spring, includes a body 100, which is substantially U shaped, with a coil 102, 104 at each end of the body 100. The coils 102 and 104 surround the hinge pin 22 and terminate at the ends 54 and 56, which extend substantially parallel to an axis of the coils 102 and 104. The ends 54 and 56 are held within the slots 50 and 52 to press against the slots 50 and 52 during movement of the cam arm 14 to prevent rotation of the coils 102 and 104 during rotation of the cam arm 14. The coils 102 and 104 are symmetric allowing even forces to be applied at each end 54 and 56 when the cam arm 14 is moved from the unlocked position to the locked position thereby allowing for easy movement of the cam arm 14.

Figure 11:
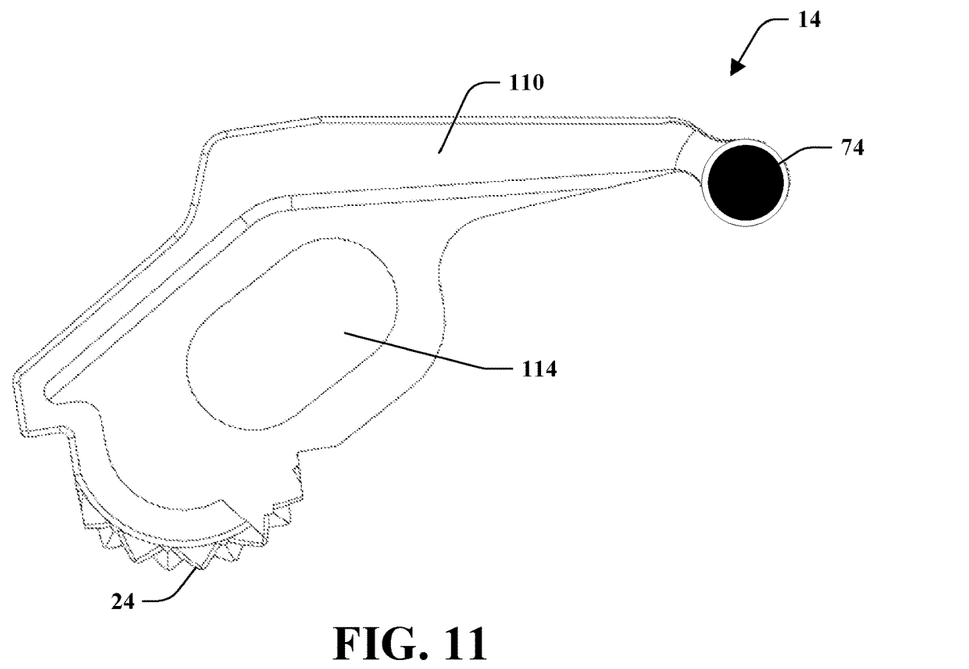
FIG. 11 is a side view of a cam arm of the cam buckle.
Figure 12:
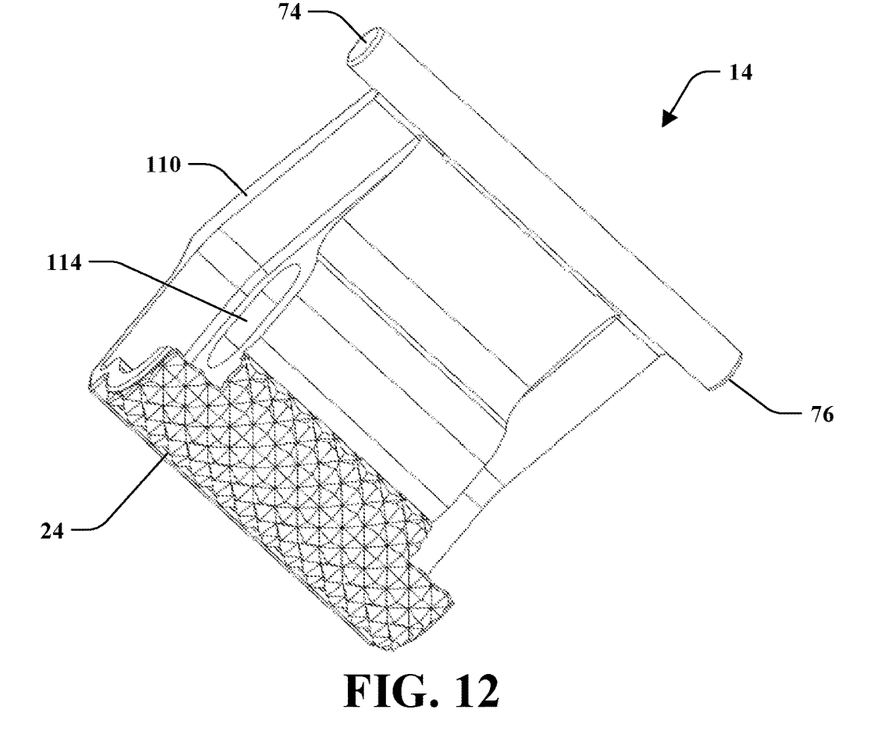
FIG. 12 is a bottom perspective view of the cam arm.

Turning now FIGS. 11 and 12 and to the cam arm 14 in detail, the cam arm 14 is positioned between the first and second plates 30 and 32 and includes a body 110 having a grip area 112 for a finger of a user to press against when moving the cam arm 14 between the unlocked and locked positions. The grip area 112 can be recessed providing a wall for a user's finger to contact and can include a knurled surface or the like for gripping by the user. Extending outward from a rear of the body 110 are the bosses 74 and 76. The bosses 74 and 76 extend outward in a direction parallel to an axis of the hinge pin 22 for extending out of the slots 70 and 72 in the locked position. Extending downward from a front of the body 110 are the teeth 24, which are shown on a curved portion of the body 110 to allow the teeth 24 to move relative to the teeth 26 during movement of the cam arm 14 without interference. The body 110 also includes a passage 114 extending therethrough through which the hinge pin 22 extends. The passage 114 is substantially obround shaped in cross-section such that the cam arm 14 can move relative to the hinge pin 22 as the cam arm 14 pivots relative to the hinge pin 22. The hinge pin 22 is positioned at the front of the passage 114 in the unlocked position in FIG. 1, and the hinge pin 22 is positioned at the rear of the passage 114 in the locked position shown in FIG. 14.

Figure 1:
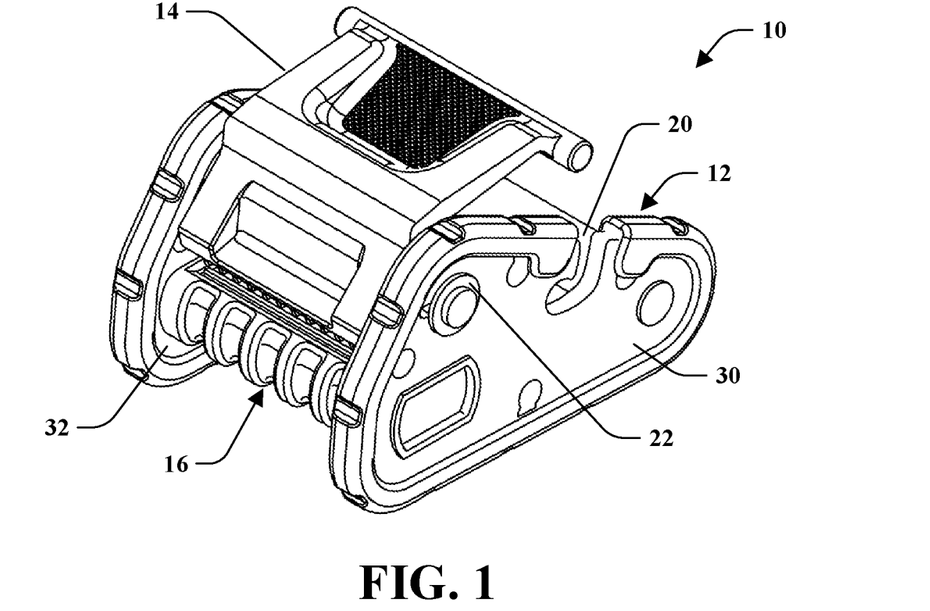
FIG. 1 is a front perspective view of an exemplary cam buckle in a first position.
Figure 2:
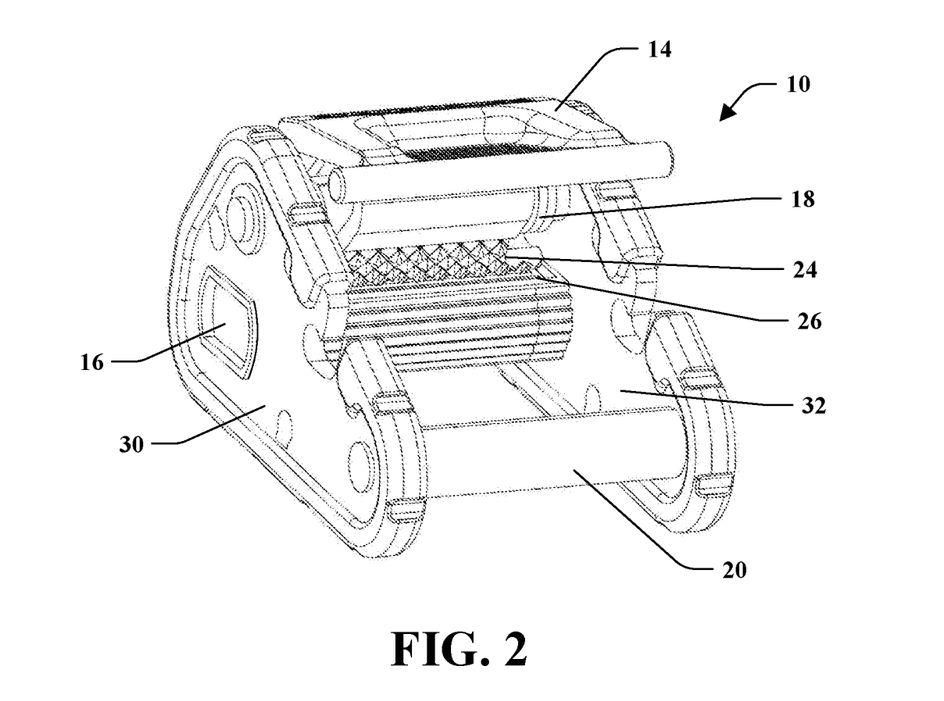
FIG. 2 is a rear perspective view of the cam buckle.
Figure 3:
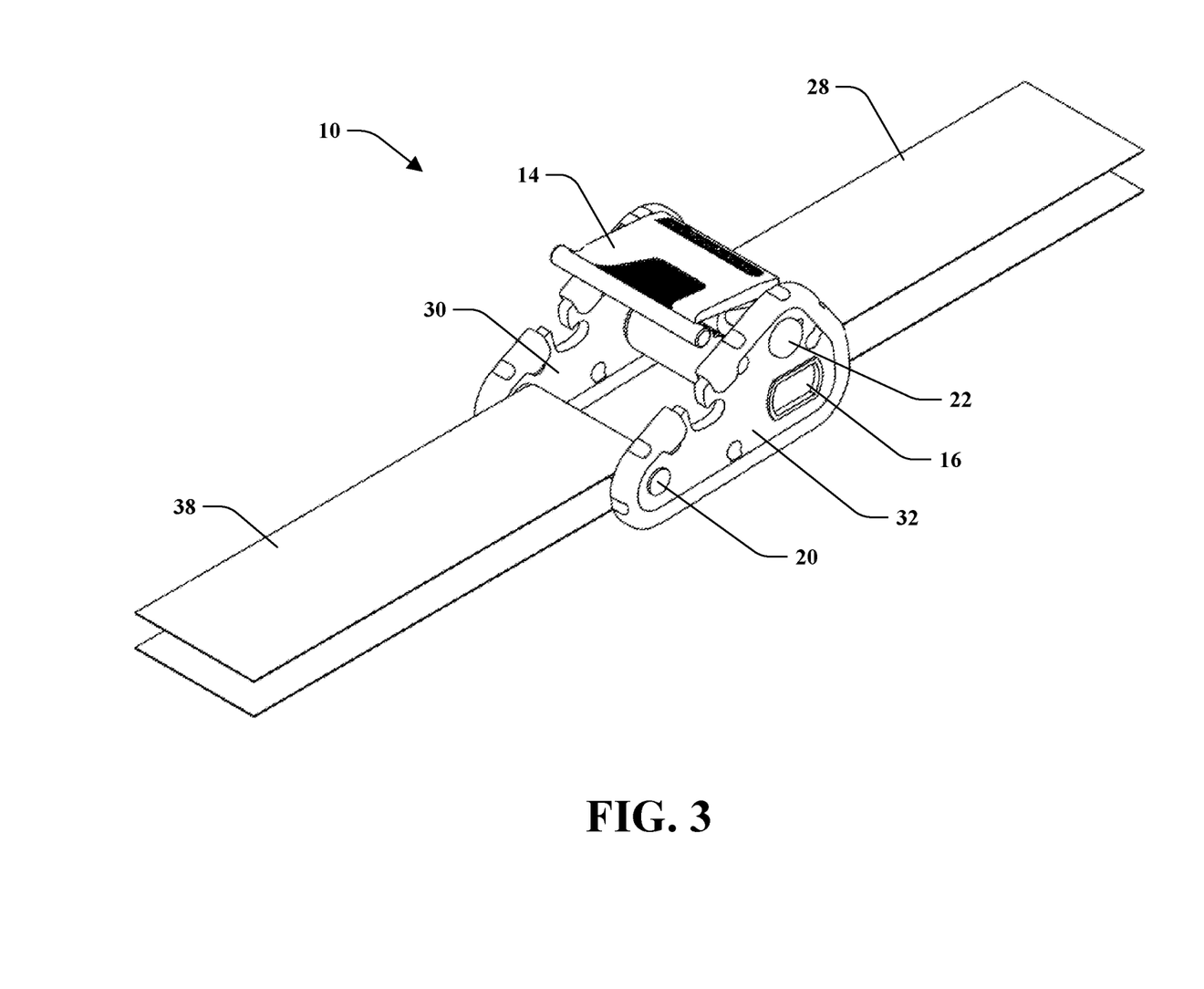
FIG. 3 is another rear perspective view of the cam buckle showing webbing attached to the cam buckle.
Figure 4:
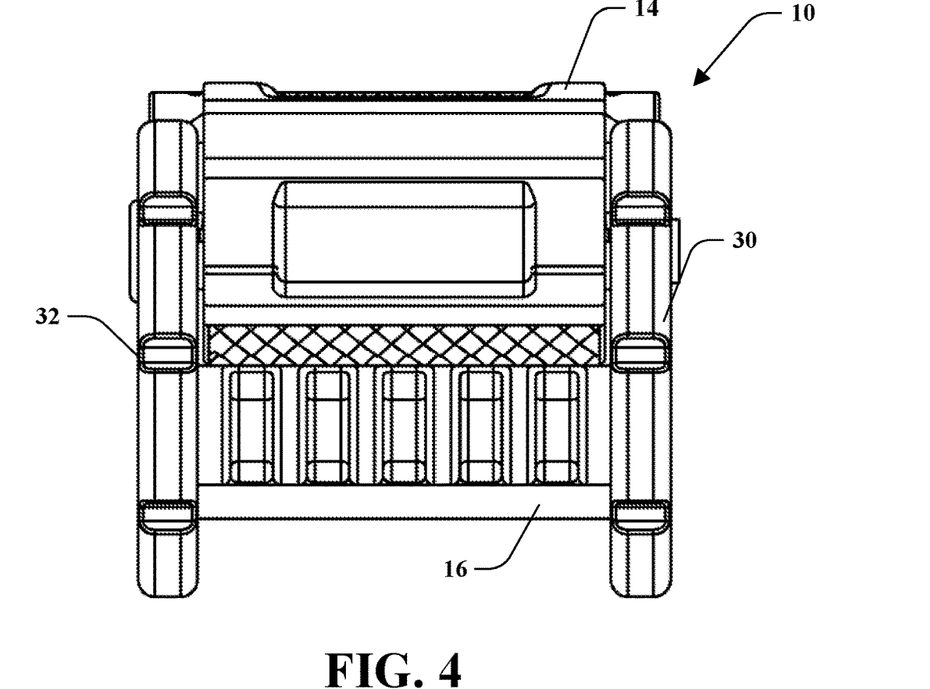
FIG. 4 is a front view of the cam buckle.
Figure 5:
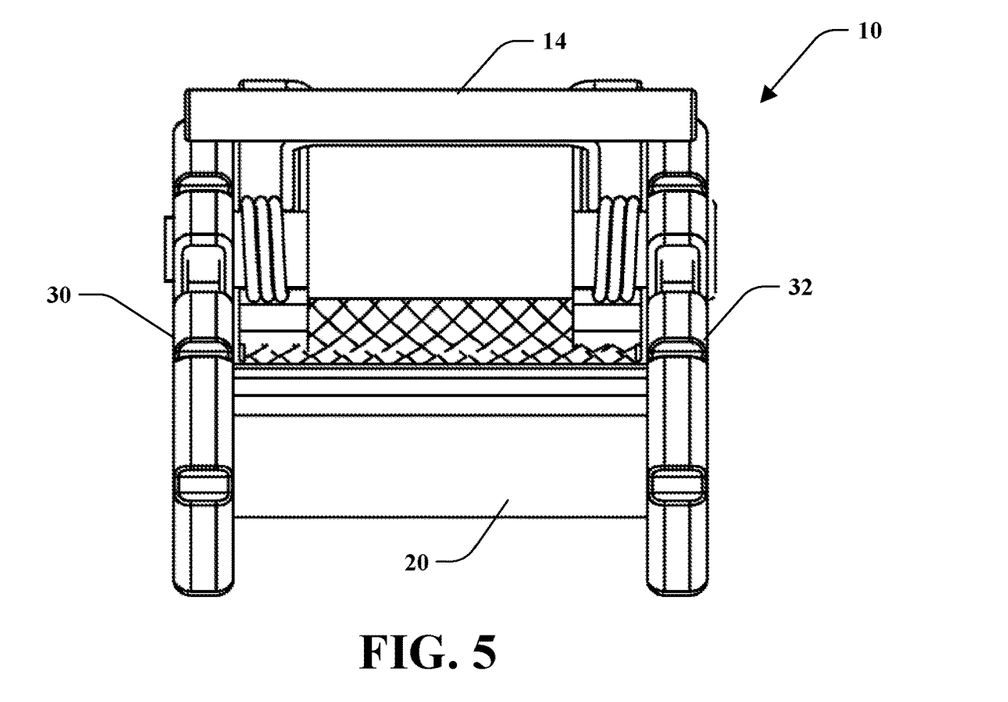
FIG. 5 is a rear view of the cam buckle.
Figure 6:
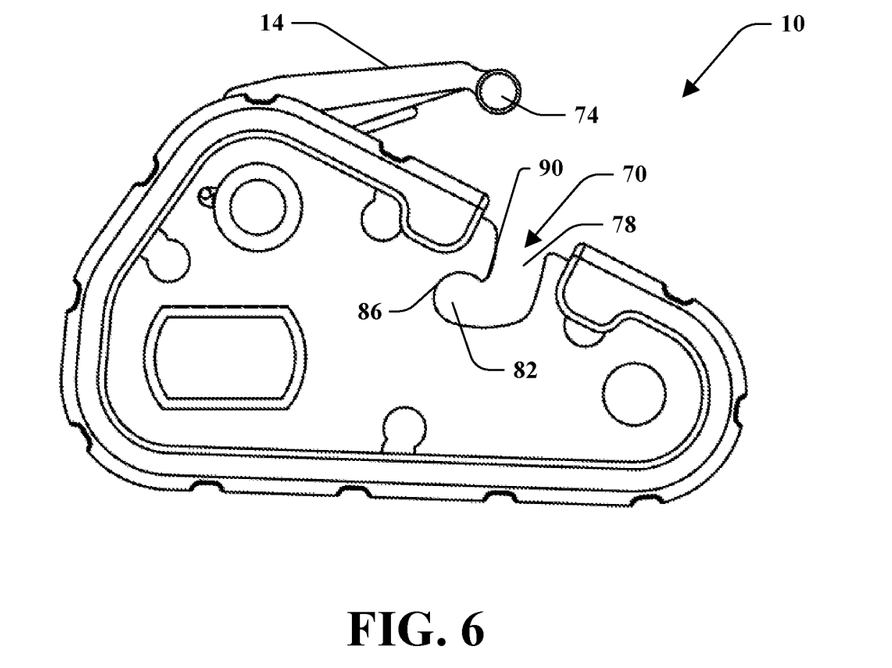
FIG. 6 is a right side view of the cam buckle.
Figure 7:
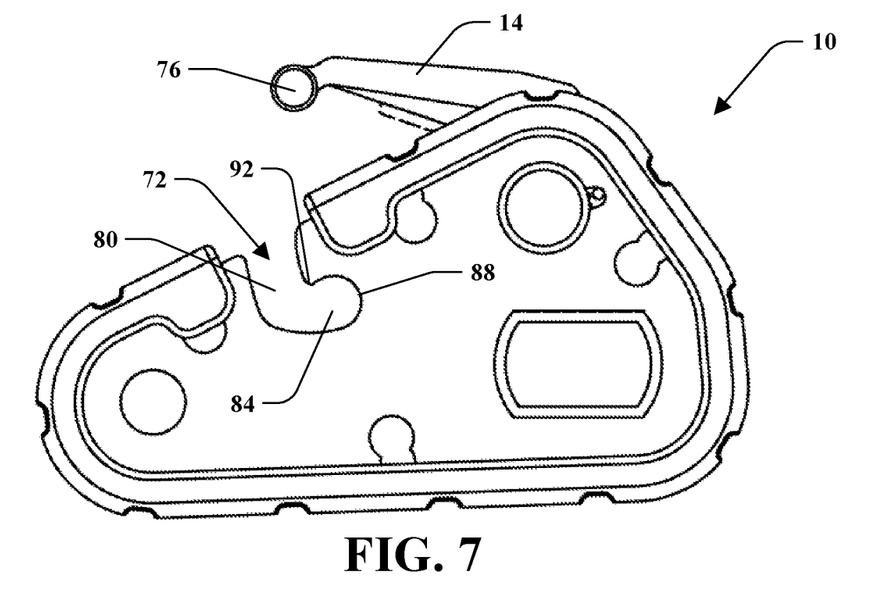
FIG. 7 is a left side view of the cam buckle.
Figure 8:
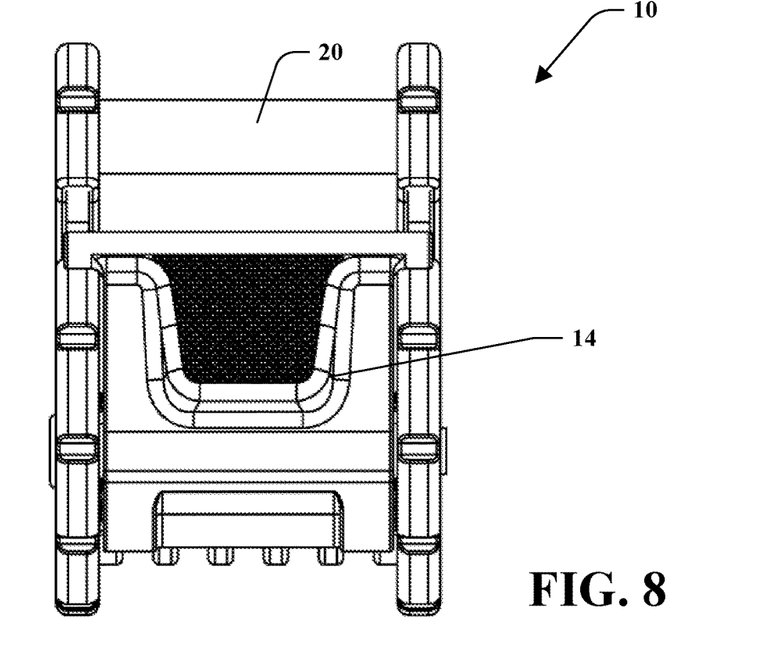
FIG. 8 is a top view of the cam buckle.
Figure 9:
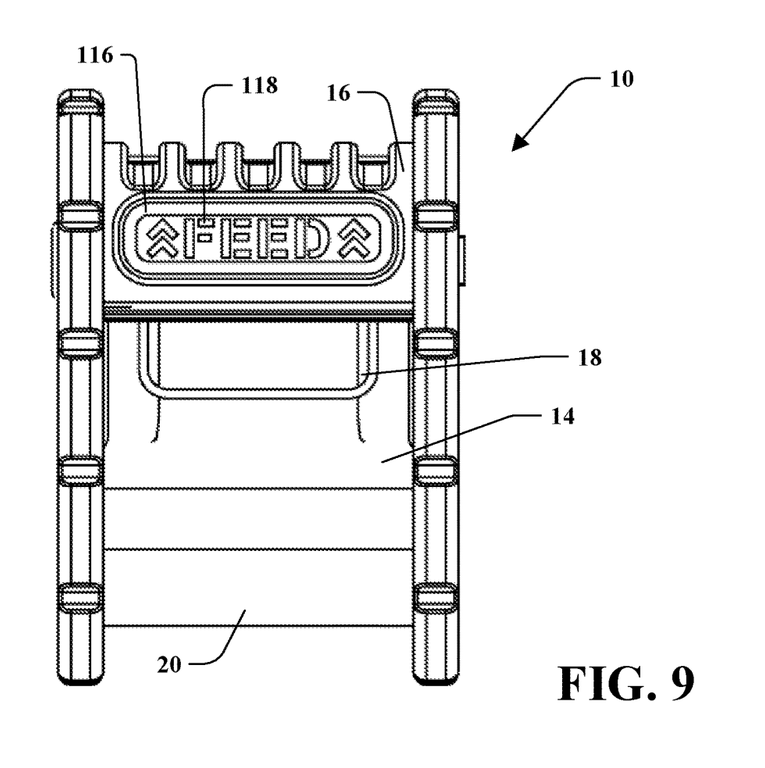
FIG. 9 is a bottom view of the cam buckle.

Referring again to FIG. 10 and to the base 16 in detail, the base 16 includes the body 66 with the pair of projections 62 and 64 extending from the body 66 in the direction parallel to the axis of the hinge pin 22. The projections 62 and 64 each have at least one flat surface, and as shown two flat surfaces that correspond to respective flat surfaces of the openings 58 and 60, and two curved surfaces corresponding to respective curved surfaces of the openings 58 and 60. The body 66 also includes the teeth 26 that are recessed into an upper surface of the body 66. The recessed portion where the teeth 26 are provided is curved corresponding to the curve of the cam arm 14 where the teeth 24 are disposed. As shown in FIG. 9, a bottom of the body 66 can include a cavity 116 for material savings. A base of the cavity 116 can include indicia 118, such as symbols and/or arrows to assist a user in operating the cam buckle 10. As shown, the indicia 118 is the word FEED with arrows on either side indicating a feed direction for the webbing 28.

Figure 13:
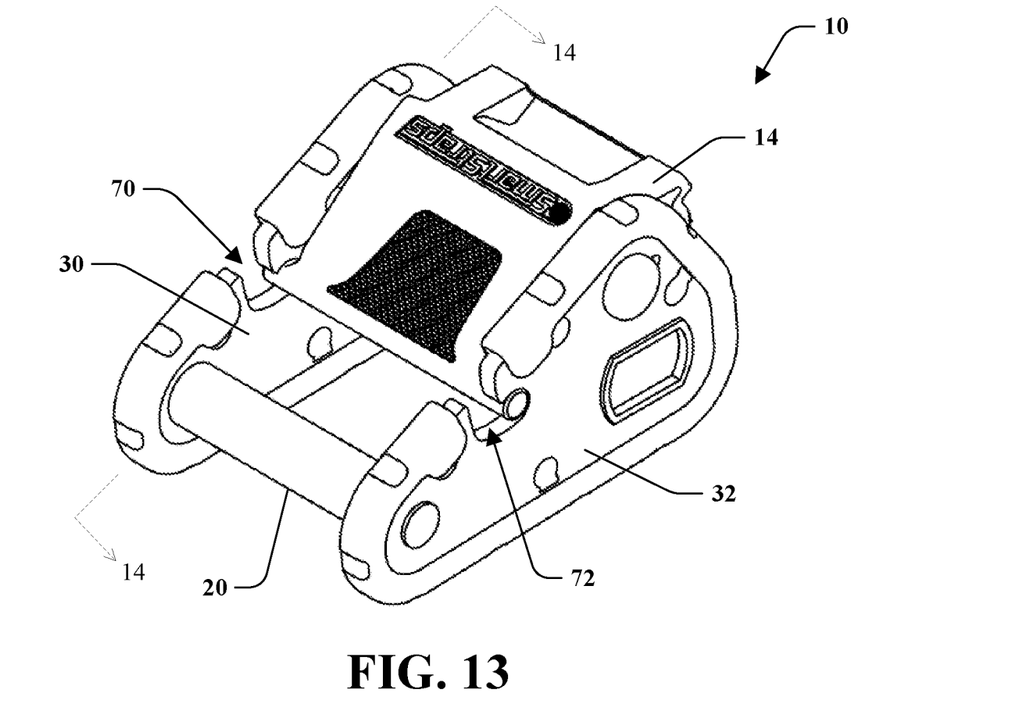
FIG. 13 is a rear perspective view of the cam buckle in a second position.

Turning now to FIGS. 13 and 14, the cam buckle 12 is shown in a second position, where the cam arm 14 is in the locked position and the teeth 24 of the cam arm 14 are away from the teeth 26 of the base 16 in an open position to allow the first webbing 28 to be fed between the teeth 24 and the teeth 26. To move the cam buckle 12 to the second position, the user pushes down the cam arm 14, thereby rotating the cam arm 14 around the axis of the hinge pin 22. As the cam arm 14 is rotated down toward the first and second plates 30 and 32, the bosses 74 and 76 enter the respective first portion 78, 80 of the slots 70 and 72. Once the bosses 74 and 76 reach the bottom of the respective first portion 78, 80, the cam arm 14 is moved forward toward the front of the first and second plates 30 and 32. The cam arm 14 moves relative to the hinge pin 22 such that the hinge pin 22 goes from being at the front of the passage 114 in the cam arm 14 to the rear of the passage 114 and the bosses 74 and 76 move from the first portions 78 and 80 of the slots 70 and 72 to the second portions 82 and 84 of the slots 70 and 72. When the hinge pin 22 is at the rear of the passage 114, the bosses 74 and 76 will be at the ends 86 and 88 of the second portions 82 and 84, and the gap is shown between the bottom of the bosses 74 and 76 and the lower portions of the ends 86 and 88. The bosses 74 and 76 are held in position by the hooks 90 and 92 of the first and second plates 30 and 32, thereby holding the cam arm 14 in the locked position to allow the first webbing 28 to be fed through the gap between the teeth 24 and the teeth 26. The hooks are sized to hold the bosses 74 and 76 while still allowing for disengagement when the cam arm 14 is moved by the operator.

After the first webbing 28 has been fed through and adjusted to approximately the desired position, the cam arm 14 is pushed downwards toward the lower portions of the ends 86 and 88 to clear the bosses 74 and 76 from the hooks 90 and 92. The cam arm 14 is then moved toward the back of the first and second plates 30 and 32, thereby moving the bosses 74 and 76 toward the first portions 78 and 80 of the slots 70 and 72 and positioning the hinge pin 22 in the front of the passage 114. The cam arm 14 can then be released and the resilient member 18 will move the cam arm 14 back to the unlocked position where the first webbing 28 will be held between the teeth 24 and 26. The user can then pull on the loose end of the first webbing 28 to tighten the first webbing. In this way, the cam buckle 10 can operate similarly to a traditional cam buckle and with the same number of moving components as the traditional cam buckle, while being able to lock the cam arm 14 in the locked position to allow for easier feeding and adjustment of the webbing than a traditional cam buckle.

Although certain embodiments have been shown and described, it is understood that equivalents and modifications falling within the scope of the appended claims will occur to others who are skilled in the art upon the reading and understanding of this specification.

What is claimed is:

1. A cam buckle comprising:
a body having at least one slot;
a cam arm movably coupled to and pivotable relative to the body, the cam arm having a first end, a second end, teeth at the first end for engaging a webbing, at least one boss at the second end for engaging the at least one slot, and a passage extending through the cam arm located between the first and second ends; and
a hinge pin disposed in the passage and coupled to the body,
wherein the cam arm is biased in an unlocked position where the teeth are configured to engage the webbing so that the webbing is held from movement, and the cam arm is movable to a locked position where the teeth are configured to be disengaged from the webbing so that the webbing is allowed to be adjusted and the at least one boss is held in the at least one slot.

2. The cam buckle according to claim 1, wherein the at least one slot includes a pair of opposed slots, and wherein the at least one boss includes a pair of opposed bosses for engaging a respective one of the pair of opposed slots.

3. The cam buckle according to claim 2, wherein the body includes first and second plates each including one of the pair of opposed slots, and wherein the cam arm is positioned between the first and second plates near a front of the first and second plates.

4. The cam buckle according to claim 3, wherein the slots open to a top of respective first and second plate and each include a first portion extending downward from the top of the respective first and second plate and a second portion extending toward the front of the first and second plates.

5. The cam buckle according to claim 4, wherein the pair of bosses extend outward from the cam arm parallel to a pivot axis in opposite directions, and wherein the pair of bosses are configured to be received in the second portions of the respective slots in the locked position.

6. The cam buckle according to claim 1, wherein the cam arm is movable and pivotable relative to the hinge pin during movement from the unlocked position to the locked position, and wherein in the unlocked position the hinge pin is positioned at a front of the passage and in the locked position the hinge pin is positioned at a rear of the passage.

7. The cam buckle according to claim 1, further including a spring biasing the cam arm in the unlocked position, the spring including a body abutting the cam arm and coils at opposite ends thereof surrounding the hinge pin.

8. The cam buckle according to claim 7, where each coil terminates at an end extending outward parallel to an axis of the hinge pin, and wherein each end is held within a respective slot in the body to prevent rotation of the spring during rotation of the cam arm.

9. The cam buckle according to claim 1, further including a base attached to the body below the cam arm, the base including teeth configured to be in close proximity to the teeth of the cam arm when the cam arm is in the unlocked position.

10. The cam buckle according to claim 9, wherein the teeth on the base are recessed into an upper surface of the base.

11. A cam buckle comprising:
a body having first and second opposed slots;
a cam arm movable relative to the body from an unlocked position to a locked position and pivotable relative to the body about a pivot axis, the cam arm having teeth for engaging a webbing in the unlocked position so that the webbing is held from movement, first and second bosses configured to engage the first and second opposed slots respectively in the locked position so that the webbing is allowed to be adjusted, and a passage extending therethrough;
a deflectable member biasing the cam arm in the unlocked position; and
a hinge pin disposed in the passage and coupled to the body,
wherein the cam arm is movable and pivotable relative to the hinge pin during movement from the unlocked position to the locked position, and
wherein in the unlocked position the hinge pin is positioned at a front of the passage and in the locked position the hinge pin is positioned at a rear of the passage.

12. The cam buckle according to claim 11, wherein the body includes first and second plates including the first and second opposed slots respectively, and wherein the cam arm is positioned between the first and second plates near a front of the first and second plates.

13. The cam buckle according to claim 12, wherein the first and second slots open to a top of the first and second plates respectively and each include a first portion extending downward from the top of the respective first and second plate and a second portion extending toward the front of the first and second plates.

14. The cam buckle according to claim 13, wherein the first and second bosses extend outward from the cam arm parallel to the pivot axis, and wherein the first and second bosses are configured to be received in the second portions of the respective slots in the locked position.

15. The cam buckle according to claim 11, further including a spring biasing the cam arm in the unlocked position, the spring including a body abutting the cam arm and coils at opposite ends thereof surrounding the hinge pin.

16. A cam buckle comprising:
a body having first and second plates laterally spaced from one another, the first plate having a first slot and the second plate having a second slot;
a cam arm disposed between the first and second plates and movable and pivotable relative to the first and second plates between an unlocked position and a locked position, the cam arm having teeth for engaging a webbing in the unlocked position so that the webbing is held from movement and first and second bosses extending outward from the cam arm for engaging a respective one of the first and second slots in the locked position so that the webbing is allowed to be adjusted; and
a base attached to the first and second plates, the base including teeth that are in close proximity to the teeth of the cam arm in the unlocked position to engage the webbing therebetween,
wherein the cam arm is biased in the unlocked position and the cam arm is movable to the locked position where the teeth on the cam arm are spaced from the teeth on the base and the first and second bosses engage the first and second slots.

17. The cam buckle according to claim 16, wherein the first slot opens to a top of the first plate and the second slot opens to a top of the second plate, and wherein each slot includes a first portion extending downward from the top of the respective first and second plate and a second portion extending toward a front of the first and second plates.

18. The cam buckle according to claim 17, wherein the first and second bosses extend outward from the cam arm parallel to a pivot axis of the cam arm, and wherein the first and second bosses are configured to be received in the second portions of the respective slots in the locked position.

19. The cam buckle according to claim 16, wherein the teeth on the cam arm are on a curved surface and the teeth on the base are recessed into an upper surface of the base and correspondingly curved to the teeth on the cam arm.

* * * * *